(12) United States Patent
Shimizu et al.

(10) Patent No.: US 11,785,971 B2
(45) Date of Patent: Oct. 17, 2023

(54) COOKED RICE FORMING APPARATUS

(71) Applicant: GTEC INCORPORATED, Osaka (JP)

(72) Inventors: Masahiro Shimizu, Osaka (JP);
Masahiko Tamaki, Osaka (JP);
Kazuhiro Mitani, Osaka (JP)

(73) Assignee: GTEC INCORPORATED, Osaka (JP)

( * ) Notice: Subject to any disclaimer, the term of this patent is extended or adjusted under 35 U.S.C. 154(b) by 0 days.

(21) Appl. No.: 18/048,847

(22) Filed: Oct. 23, 2022

(65) Prior Publication Data

US 2023/0108932 A1     Apr. 6, 2023

Related U.S. Application Data

(63) Continuation of application No. PCT/JP2021/025096, filed on Jul. 2, 2021.

(30) Foreign Application Priority Data

Oct. 20, 2020  (JP) .................................. 2020-175732

(51) Int. Cl.
 *A23B 9/06*   (2006.01)
 *A23L 7/143*   (2016.01)
 (Continued)

(52) U.S. Cl.
 CPC ............... *A23L 7/143* (2016.08); *A23B 9/06* (2013.01); *A23L 3/28* (2013.01); *A23L 7/196* (2016.08); *A23P 30/00* (2016.08)

(58) Field of Classification Search
 CPC .. A21C 3/02; A21C 3/024; A21C 9/08; A21C 11/08; A23P 30/00; A23P 30/10;
 (Continued)

(56) References Cited

U.S. PATENT DOCUMENTS 4,556,379 A * 12/1985 Ikishima ............... B30B 15/302
                                                                425/371
6,053,097 A *  4/2000 Suzuki .................... A23L 7/126
                                                                99/450.2
(Continued)

FOREIGN PATENT DOCUMENTS

CN          210747086 U      6/2020
JP          H10-210941 A     8/1998
(Continued)

*Primary Examiner* — Reginald Alexander
(74) *Attorney, Agent, or Firm* — Muncy, Geissler, Olds & Lowe, P.C.

(57) ABSTRACT

A cooked rice forming apparatus for forming cooked rice into a desired shape includes a light guide part that is provided with a first surface and a second surface, and is made of a material having transparency, wherein the first surface is in slidably contact with one side of the cooked rice, and has a slope, and the second surface is arranged on a lower side of the slope and on the other side of the cooked rice; a light source part that emits ultraviolet rays and is provided near the light guide part; a forming part that is arranged below a lower side of the slope, and forms the cooked rice into the desired shape; and a housing body that accommodates an input part, a discharging part, the light guide part, the light source part and the forming part, wherein the light guide part is configured such that at least the first surface and the second surface glow due to the ultraviolet rays emitted from the light source part.

14 Claims, 7 Drawing Sheets

(51) Int. Cl.
*A23L 3/28* (2006.01)
*A23L 7/196* (2016.01)
*A23P 30/00* (2016.01)

(58) Field of Classification Search
CPC . A23P 30/20; A23L 7/10; A23L 1/196; A23B 9/04; A23B 9/06
See application file for complete search history.

(56) References Cited

U.S. PATENT DOCUMENTS

| | | | |
|---|---|---|---|
| 8,672,664 B2 * | 3/2014 | Uchida | A23P 30/10 425/315 |
| 2007/0180843 A1 * | 8/2007 | Park | A23L 19/20 62/177 |
| 2017/0245527 A1 * | 8/2017 | Dobrinsky | A23L 3/28 |
| 2019/0320670 A1 * | 10/2019 | Hathaway | A23L 3/001 |

FOREIGN PATENT DOCUMENTS

| | | | | |
|---|---|---|---|---|
| JP | 2000-245369 A | 9/2000 | | |
| JP | 2004-344716 A | 12/2004 | | |
| JP | 2011-078473 A | 4/2011 | | |
| WO | WO-2013126961 A1 * | 9/2013 | | A23B 7/015 |

* cited by examiner

COOKED RICE FORMING APPARATUS

CROSS REFERENCE TO RELATED APPLICATIONS

This application is a continuation of a PCT application No. PCT/JP2021/025096 filed on Jul. 2, 2021, which is based on and claims priority to Japanese Patent Applications No. 2020-175732 filed on Oct. 20, 2020, the disclosures of which are incorporated herein by reference.

TECHNICAL FIELD

The present invention relates to a cooked rice forming apparatus for forming cooked rice into a desired shape and sterilizing the cooked rice.

BACKGROUND

In recent years, automation has progressed at food production sites. For example, an apparatus for automatically producing sushi rice balls from vinegared rice as disclosed in Patent Document 1 has been developed. The sushi rice balls are in general called "Shari-Dama."

Nigiri sushi is a popular Japanese food overseas. However, the production requires a high degree of skill, as saying, "3 years for rice cooking, 5 years for blending, and a lifetime for matching the ingredients." For this reason, there is a chronic shortage of "craftsmen (Syoku-Nin)" who have mastered the techniques necessary to make nigiri sushi. The production cost of nigiri sushi is also high.

Under such circumstances, the apparatus disclosed in Patent Document 1 can produce sushi rice balls with a constant quality regardless of the skill of the user, and can also reduce producing costs by reducing labor costs. Therefore, the apparatus is mainly used in factories that produce side dishes for supermarkets and convenience contains, restaurants, conveyor belt sushi restaurants, and the like.

In addition, in hot and humid summer season such as the rainy season in Japan, food poisoning caused by bacteria such as O-157, *Salmonella, Campylobacter*, and *Staphylococcus aureus* occurs frequently. Even in winter, the number of viral food poisoning cases, including norovirus, increases year by year. Therefore, in recent years, measures against food poisoning have become essential throughout the year. Furthermore, at the time of the filing of the present application, the demand for products/apparatus with anti-infectious disease measures, such as sterilization functions, increases due to the spread of coronavirus

PRIOR ART

[Patent Document]
[Patent Doc. 1] JP Laid-Open Patent Application Publication 2000-245369

OBJECTIVES OF THE PRESENT INVENTION

However, the demand for apparatus for automatically producing sushi rice balls has been focused on working sites assuming mass production as described above. Increasing production speed was the main subject for the development. For this reason, many of the apparatuses that automatically produce sushi rice balls are large and heavy. Such apparatuses were not suitable for small restaurants or home use.

Further, in the conventional technology, sterilization was simply performed by providing sterilization lamps in a conveyer path of sushi rice balls. In this case, the irradiated surface on which the sterilization lamp irradiate is sterilized. On the other hand, there is a drawback that the other surface that is not irradiated by the sterilization lamp is not sterilized. It is also conceivable to provide a plurality of sterilization lamps and to apply these lamps from various directions. However, it leads to an increase in the size of the apparatus.

The present invention was made in view of such a circumstance. One of the objectives of the present invention is to provide a compact and lightweight cooked rice forming apparatus having a function of sterilizing the cooked rice in the process of forming the cooked rice into a desired shape.

SUMMARY

A cooked rice forming apparatus according to the first aspect of the present invention for forming cooked rice into a desired shape wherein the cooked rice is evenly spread in a sheet like shape having smaller in a thickness direction rather than in a surface direction and is fed into the cooked rice forming apparatus, the apparatus comprising: a light guide part that is provided with a first surface and a second surface, and is made of a material having transparency wherein the first surface, is in slidably contact with one side of the cooked rice, and is inclined with respect to an installation surface of the cooked rice forming apparatus so that the first surface has a slope, and the second surface is arranged on a lower side of the slope of the first surface and arranged on the other side of the cooked rice where the cooked rice is not in slidably contact with the first surface; a light source part that is a light source to emit ultraviolet rays and is provided near the light guide part; a forming part that is arranged below a lower side of the slope of the first surface of the light guide part, and forms the cooked rice into the desired shape; and a housing body that accommodates an input part, a discharging part, the light guide part, the light source part and the forming part wherein the input part is arranged above an upper side of the slope of the first surface of the light guide part, and is an opening portion through which the cooked rice is fed, and the discharging part is arranged below the forming part and is an opening portion through which the cooked rice that has been formed in the desired shape by the forming part is discharged, wherein the light guide part is configured such that at least the first surface and the second surface glow due to the ultraviolet rays emitted from the light source part. According to the above configuration, the input part, the light guide part, the forming part, and the discharging part are arranged in a vertical direction with respect to the installation surface of the cooked rice forming apparatus. As a result, the area of the installation surface area is reduced. In addition, the forming part is arranged below the lower side of the slope of the first surface of the light guide part, and the cooked rice fed through the feeding part slides on the first surface due to its weight and moves to the forming part. Therefore, it is not necessary to provide an actuator for moving the cooked rice to the forming part. Furthermore, the light guide part is made of a material having transparency, and one surface of the fed cooked rice in sheet shape receives ultraviolet rays irradiated from the first surface, and the other surface can receive ultraviolet rays irradiated from the second surface. As a result, the entire cooked rice is sterilized without providing light sources at a plurality of positions. That is, it is possible to provide a compact and lightweight cooked rice forming apparatus having a function of sterilizing the cooked rice in the process of forming the cooked rice into a desired shape With respect to the cooked rice forming apparatus according to the second aspect of the present invention, the light guide part is composed with two or more members, and one of the members is provided near the other members adjacent. According to the above configuration, the light guide part is composed with a plurality of members without obstructing light emissions from the first surface and the second surface. In other words, the number of members is appropriately changed so that the light guide part is easily disassembled and cleaned, or easily manufactured With respect to the cooked rice forming apparatus according to the third aspect of the present invention, the housing is made of a material that does not transmit ultraviolet rays, the housing has a lid part to open and close the input part, the cooked rice forming apparatus comprises a light source control part that controls to turn on and off the light source of the light source part, and the light source control part controls to turn off the light source when the lid is opened under a condition where the light source is on. According to the above configuration, the users are prevented from being exposed to the ultraviolet-ray.

With respect to the cooked rice forming apparatus according to the fourth aspect of the present invention, at least a portion of the first surface and a portion of the second surface of the light guide part are translucent.

With respect to the cooked rice forming apparatus according to the fifth aspect of the present invention, the light guide part has unevenness on at least a portion of the first surface and a portion of the second surface.

With respect to the cooked rice forming apparatus according to the sixth aspect of the present invention, the cooked rice is vinegared rice, the forming part forms the vinegared rice into a sushi rice ball shape.

A cooked rice forming apparatus according to the seventh aspect of the present invention comprises a cooked rice contain part that is made of a material having transparency and contains cooked rice; a light source part as an ultraviolet light source that is provided near the cooked rice contain part; and a forming part that forms the cooked rice into a desired shape, wherein the cooked rice contain part is configured such that at least an inside thereof glows due to ultraviolet rays emitted from the light source part. According to the above configuration, the inside of the cooked rice contain part becomes a sterilized space that is sterilized with ultraviolet rays so that the cooked rice, which is contained in the contain part, is entirely sterilized.

With respect to the cooked rice forming apparatus according to the eighth aspect of the present invention, the forming part is made of a material having transparency. According to the above configuration, by guiding the ultraviolet rays emitted from light sources such as ultraviolet LEDs provided inside or outside the forming part, the forming part is configured such that the surface of the forming part glows due to the ultraviolet rays or the ultraviolet rays penetrate the forming part and come out of the surface. Namely, it is possible to sterilize the cooked rice during the process in which the cooked rice BH is formed into the sushi rice ball shape.

In another aspect of the present invention, the light guide part is configured with at least two different members that are a first member and a second member wherein the first member has the first surface and the second member has the second surface. When assembled in the housing body, the first member and the second member are in physical contact at a contact section, and the ultraviolet rays, which is emitted from the light source part and runs in one of the first and second members, is transmitted to the other of the first and second members through the contact section such that the first and second surfaces both glow. An area of the contact section is preferably ranged from 3% to 30% with respect to an area of the first surface. An area of the contact section is preferably ranged from 3% to 40% with respect to an area of the second surface.

Regarding the amount of the area of the contact section, it is understood that 3% is necessary to transmit the UV rays enough from one member to the other member. When the area exceeds 30% of the first surface and 40% of the second surface, it becomes difficult to smoothly carry the cooked rice due to a structural restriction. Also, it becomes relatively difficult to assemble, disassemble, and clean these members. Considering these aspects, it is preferred that the area does not exceed 30% of the first surface and 40% of the second surface.

DETAILED DESCRIPTIONS OF THE PREFERRED EMBODIMENT(S)

Figure 1:
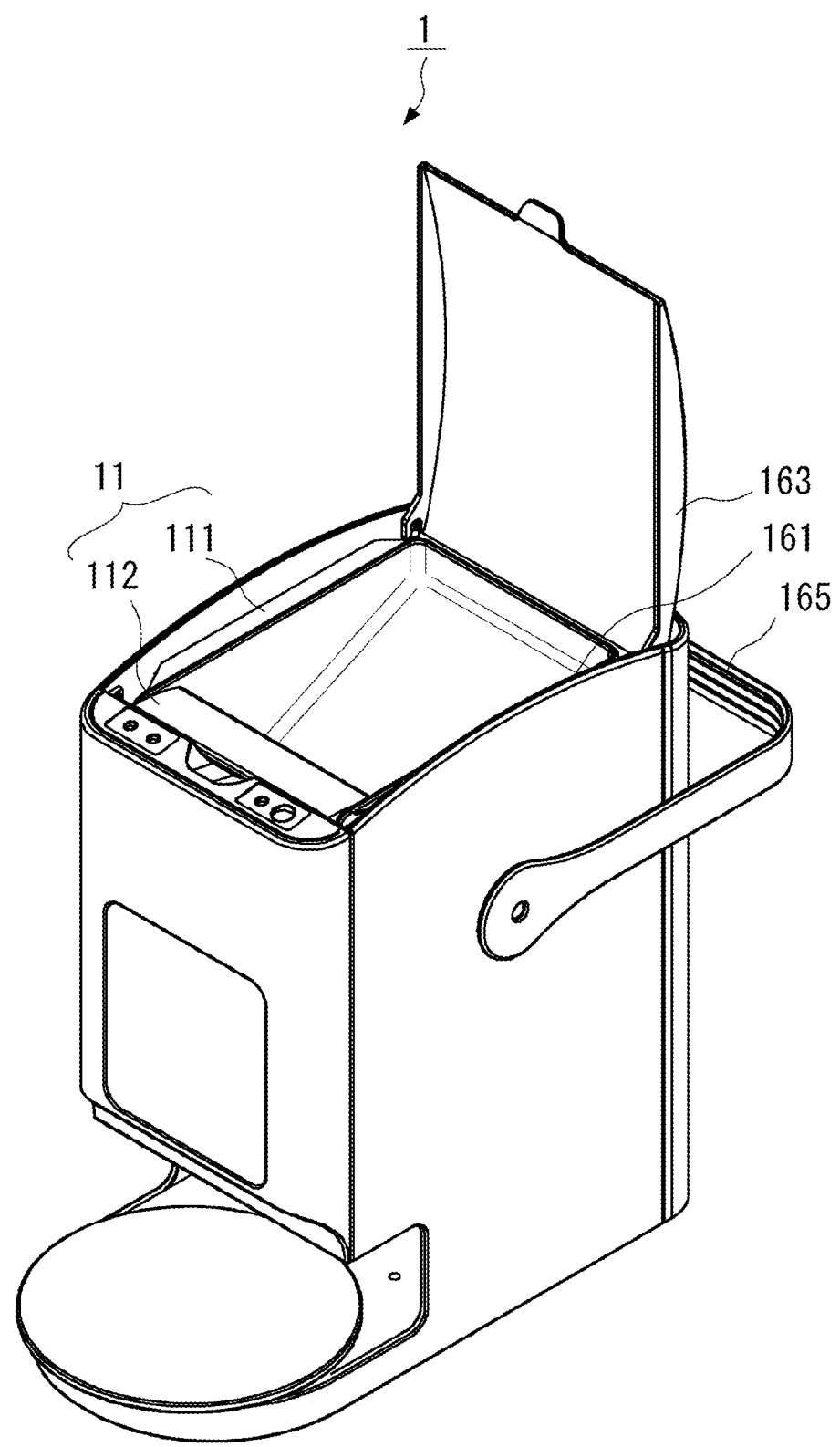
FIG. 1 is a perspective diagram showing the front, top, and right sides of a cooked rice forming apparatus according to a first embodiment to which the present invention is applied.
Figure 2:
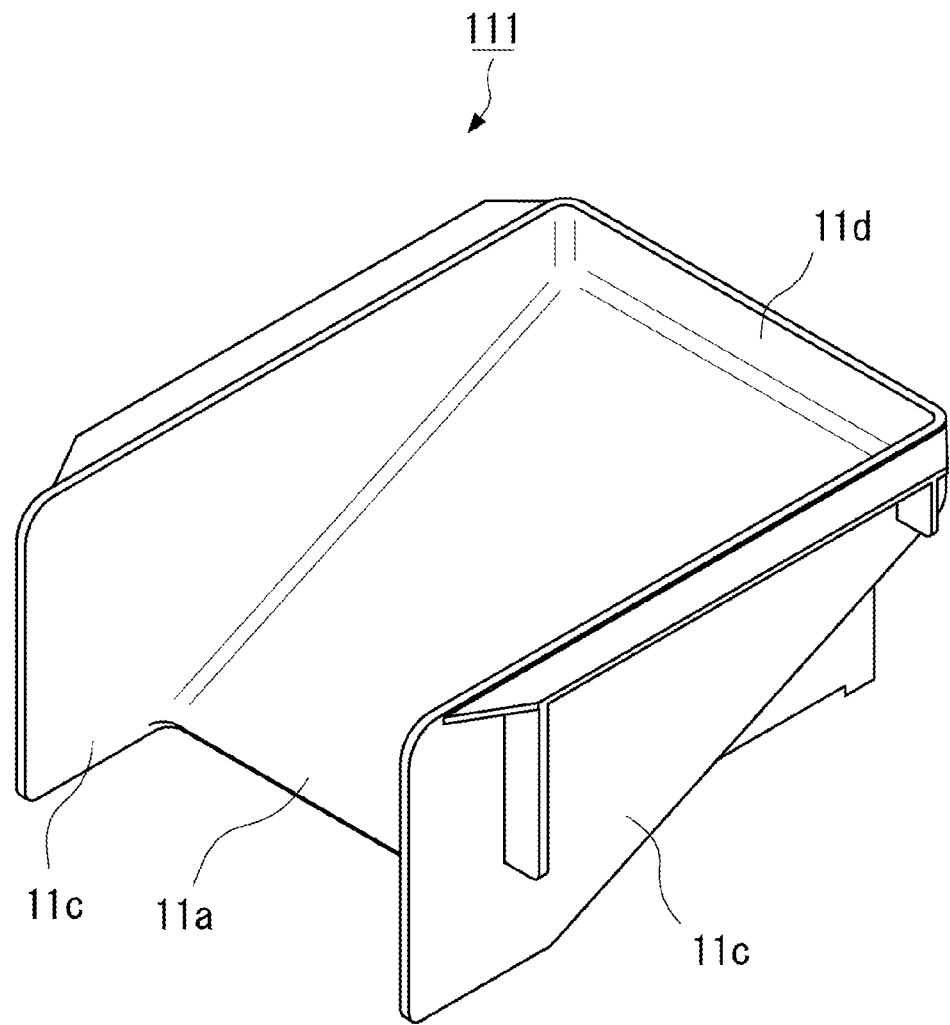
FIG. 2 is a perspective diagram showing the front, top and right sides of a first member according to the present invention.
Figure 3:
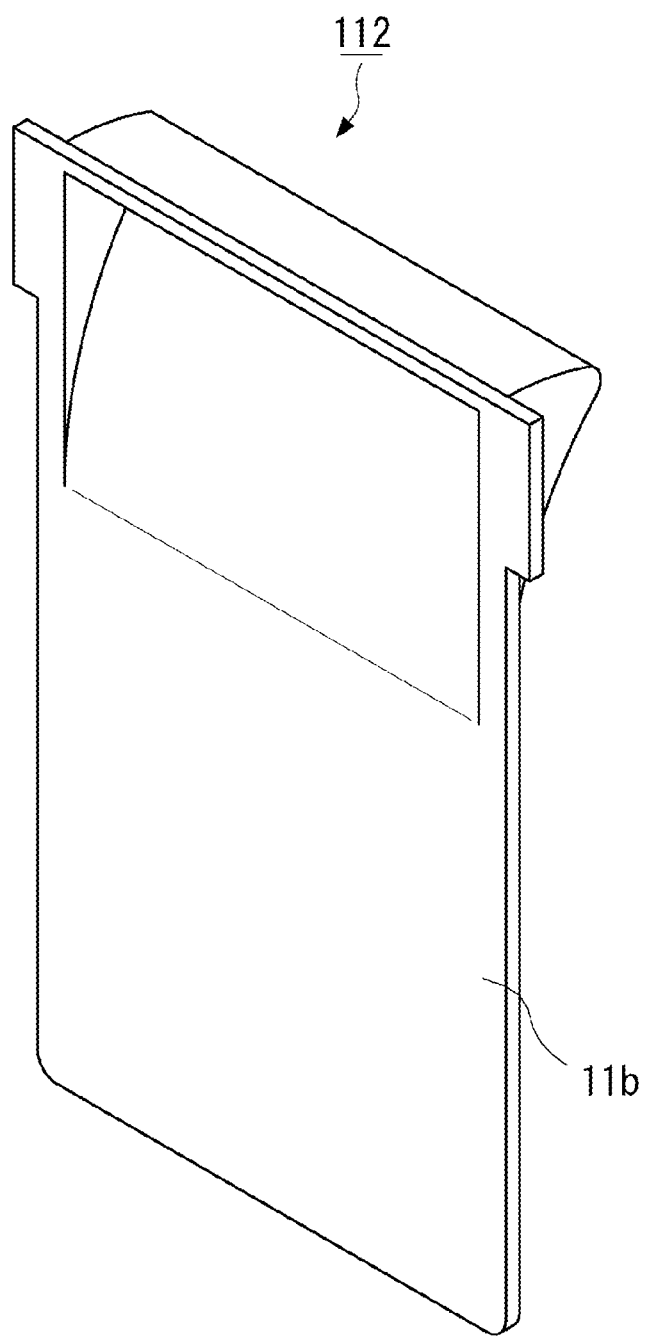
FIG. 3 is a perspective diagram showing the front, top and right sides of a second member according to the present invention.
Figure 4:
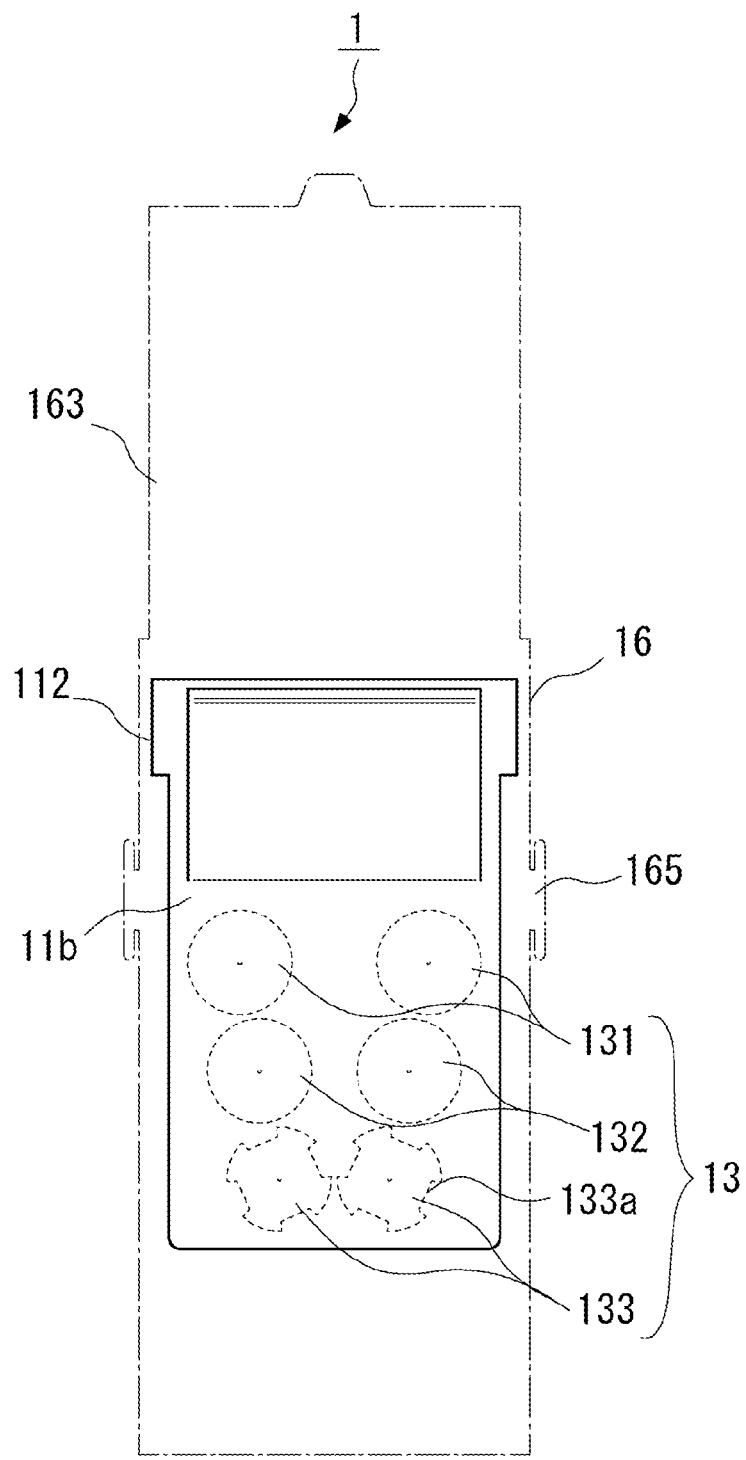
FIG. 4 is a schematic diagram showing the internal structure of the cooked rice forming apparatus in a plan view.
Figure 5:
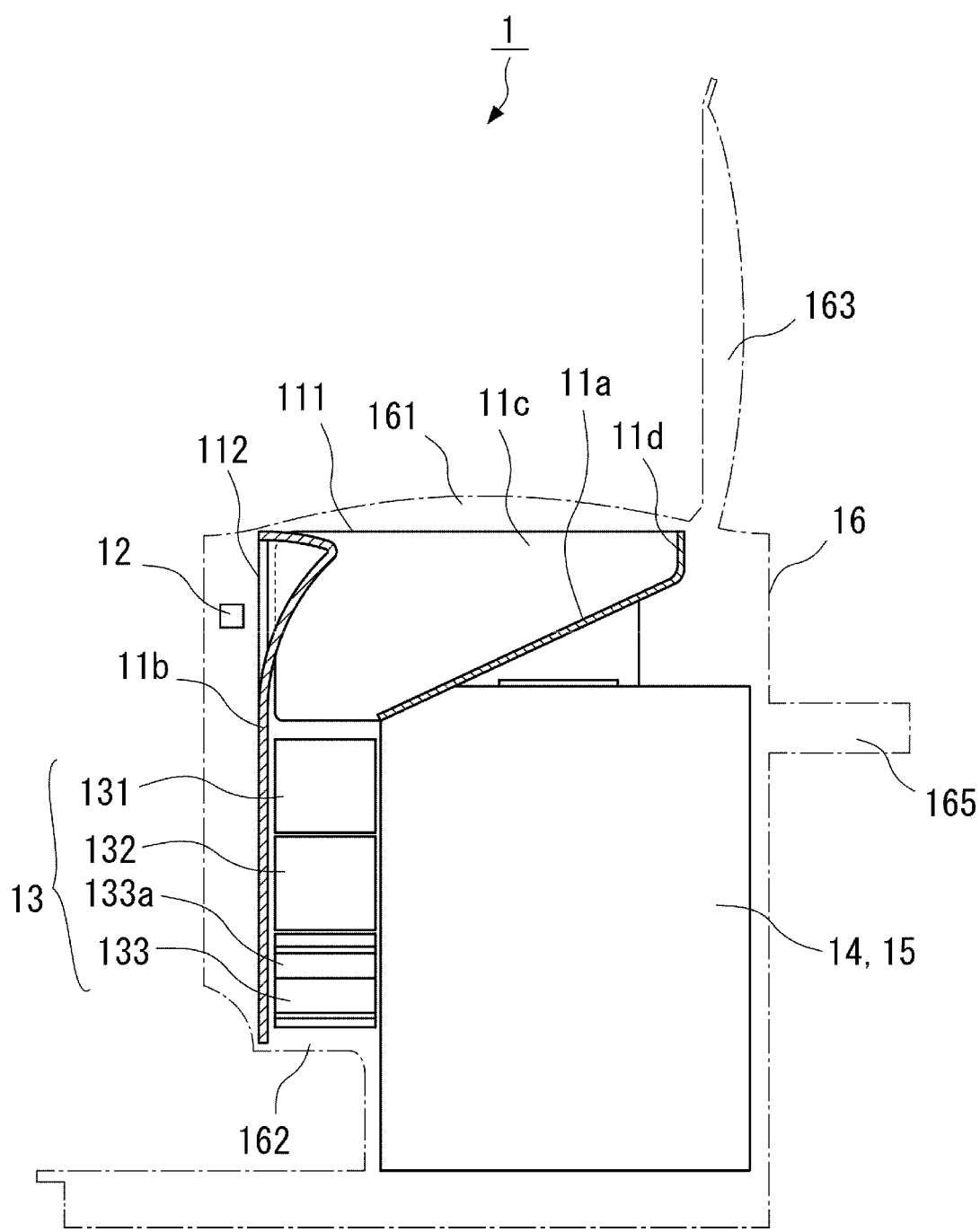
FIG. 5 is a schematic diagram showing the internal structure of the cooked rice forming apparatus in a right side view.
Figure 6:
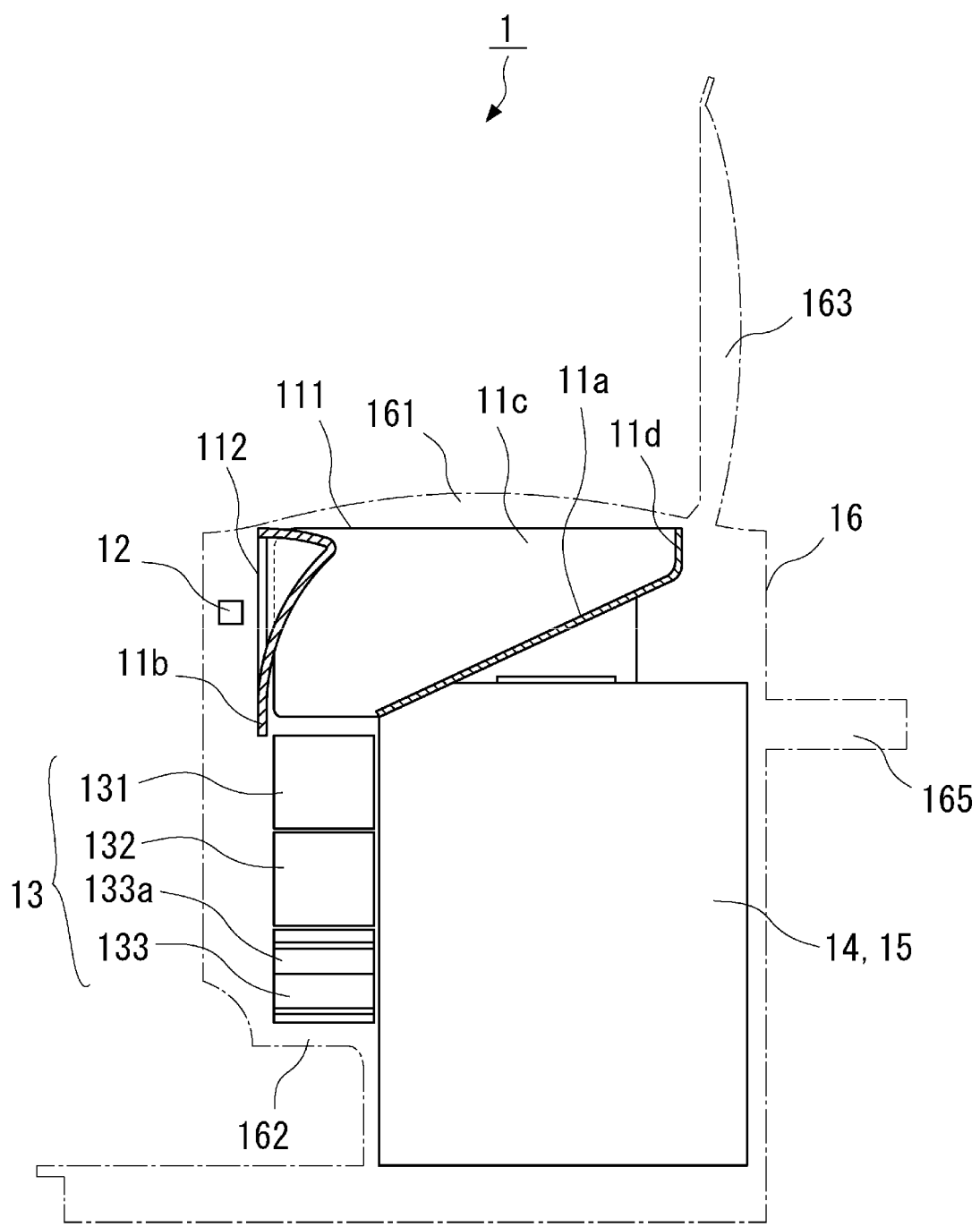
FIG. 6 is a schematic diagram showing the internal structure of the cooked rice forming apparatus in the right side view.

Hereinafter, embodiments of the present invention are described with reference to the drawings. However, the embodiments shown below are examples for embodying the technical idea of the present invention, and are not intended to limit the present invention to the following examples. Moreover, this specification does not in any way specify the members described in the Claims (or the section starting at "What is claimed is" of the present application as the members of the embodiments). Unless otherwise specified, the dimensions, materials, shapes, relative positions, and the like of components described in the embodiments are not intended to limit the scope of the present invention. The examples are merely illustrative. Note that the sizes and positional relationships of the members shown in each drawing may be exaggerated for clarifying explanations. Furthermore, in the following description, the same names and symbols indicate the same or similar (homogeneous) members, and detailed descriptions thereof may be omitted depending on the contexts. Further, each of the elements constituting the present invention may be constructed by forming a plurality of elements with the same member, and one member may be used for a plurality of elements. On the contrary, a function of one member may be realized by sharing with a plurality of the members.

(Cooked Rice Forming Apparatus 1)

As shown in FIGS. 1 to 5, cooked rice forming apparatus 1 according to an embodiment of the present invention includes cooked rice contain part 11 (corresponding to an example of a "light guide part" in the Claims), ultraviolet ray LED 12 (or UV LED 12 corresponding to an example of a "light source part" in the Claims), forming part 13, control part 14 (corresponding to an example of the "light source control part" in the Claims), power supply unit 15, and housing body 16 that accommodates them. Cooked rice forming apparatus 1 forms cooked rice BH (or rice that have been cooked to ready to eat) into a sushi rice ball shape. Herein, the cooked rice is evenly spread (or flattered) in a sheet shape and fed into the apparatus. Cooked rice forming apparatus 1 has a length of about 339 mm, a width of about 180 mm, and a height of about 400 mm, and weighs about 6 kg (approximately 13.2 lbs.) so that the apparatus can be placed on a general desk or table. Details of each member will be described below.

The food, ingredients to be fed into cooked rice forming apparatus 1 is not limited to the cooked rice BH, and may be cooked rice mixed with seasonings and ingredients, such as "Sumeshi" which means vinegared rice (cooked rice mixed with vinegar, salt, sugar, etc.) too. Also, the shape formed by cooked rice forming apparatus 1 is not limited to the "Shari-dama" shape, which is designed for eating in one bite with a slice of ingredient topped thereon. The shape of the cooked rice may be, for example, a substantially cylindrical shape like sushi rolls or a substantially triangular shape like "Onigiri."

Furthermore, cooked rice forming apparatus 1 may have a mode in which cooked rice BH, which has been evenly spread (or flattered) in a sheet like shape and fed into the apparatus, is discharged in the sheet shape (the shapes of the cooked rice BH at the times of being fed into the apparatus and discharged from the apparatus may be the same or different. It does not matter if these shapes are the same or not.) In this case, the user can make hand-rolled sushi by placing ingredients on the sheet like cooked rice BH. As a result, cooked rice forming apparatus 1 can be used as a kind of amusement equipment.

Furthermore, the terms, "sheet like" and "sheet shape," do not only refer to a state in which there is no height difference or there is no unevenness on the surface, but at least the thickness is almost/substantially uniform on the surface. The terms include a state in which there is a small difference in the thickness direction or unevenness on the surface to some degrees. In other words, even the phrase "evenly spread in a sheet like shape and fed into" does not mean that the surface is completely flat before being put into. For example, when rice is cooked in a rice cooker, etc., it means that the rice, which is in a block shape along the inner shape of the pot, is spread out at least to the extent that the variation in thickness is small in the surface direction, and then fed into the apparatus.

(Cooked Rice Contain Part 11)

Cooked rice contain part 11 is, as shown in FIGS. 1 to 5, a substantially hollow quadrangular pyramid shaped member that is composed with first member 111 and second member 112. First member 111 and second member 112 are made of translucent resin having a transparency.

First member 111 includes first surface 11a that is inclined at about 30 degrees with respect to the bottom surface of housing body 16 (namely, the installation surface of cooked rice forming apparatus 1), third surface 11c that is adjacent to first surface 11a, and fourth surface 11d that is adjacent to first surface 11a and third surface(s) 11c. In addition, second member 112 has second surface 11b that is arranged on the lower side of the slope (inclination) of first surface 11a, substantially perpendicular to the bottom surface of housing body 16, and extends from first surface 11a to forming part 13 (details of which will be described later). UV LED 12 is provided near second member 112, and second surface 11b is provided near third surface 11c.

With this configuration, the surface of second member 112 emits light (or glows) by guiding the ultraviolet rays emitted from UV LED 12. The surface of first member 111 emits light (or glows) by guiding ultraviolet rays emitted from the surface of third surface 11c of second member 112. That is, at least one surface of cooked rice BH that has been evenly spread into a sheet like shape and fed into the apparatus receives ultraviolet rays emitted from first surface 11a, and the other surface receives ultraviolet rays emitted from second surface 11b. As a result, entire cooked rice BH is sterilized without providing a function such as turning over or stirring cooked rice BH in the "step of moving the fed cooked rice BH to the forming part." In addition, since second surface 11b extends to the position of forming part 13, cooked rice BH is sterilized even in the "step of forming cooked rice BH into the sushi rice ball shape". Furthermore, since cooked rice contain part 11 is entirely illuminated (or entirely glows) with only one UV LED 12, there is no need to secure a space for providing a plurality of light sources and their control units. With this configuration, the inside of cooked rice contain part 11 is made into a sterilized space that is sterilized with ultraviolet rays. Furthermore, cooked rice BH, which is fed into the cooked rice contain part 11, slides on first surface 11a due to its own weight. Then, it moves to forming part 13 from the opening portion that is formed with the lower end of slope of first surface 11a, second surface 11b and two of third surfaces 11c. Therefore, it is not necessary to provide a function for conveying the cooked rice to the forming part.

Namely, cooked rice contain part 11 in the cooked rice forming apparatus 1 according to the embodiment of the present invention has a simple structure that does not use power (for example, electric power), and has the function of "sterilizing entire cooked rice BH" and the function of "feeding the cooked rice to the forming part" at the same time. It contributes to miniaturization and weight reduction of cooked rice forming apparatus 1.

In addition, the embodiment of cooked rice contain part 11 is not limited to the above-mentioned one. For example, cooked rice contain part 11 needs to have first surface 11a and second surface 11b. It is, however, not necessary for cooked rice contain part 11 to be composed with two independent members. First member 111 and second member 112 may be composed with a single member or three or more members. Further, cooked rice contain part 11 does not necessarily have to be made of resin, and may be made of, for example, any material having transparency such as glass. Furthermore, cooked rice contain part 11 does not necessarily have to be translucent, and may be processed so that cooked rice contain part 11 emits light (or glows) by guiding ultraviolet rays or by the ultraviolet rays penetrating the part and coming out. For this treatment/process, for example, a method of forming irregularities (unevenness) on the surface of cooked rice contain part 11 using a laser processing machine or a plotter is available. With this method, not only the UVs coming out of the surface scatters, but also the contact area between cooked rice BH and first surface 11a is reduced, and the effect that the cooked rice BH slides more easily on first surface 11a is also realized. Furthermore, it is sufficient that at least a portion of first surface 11a and a portion of second surface 11b are subjected to the above treatment, and entire cooked rice contain part 11 does not necessarily need to be subjected to the treatment. That is, a portion of first surface 11a and a portion of second surface 11b may be translucent, and the other portions may be transparent. The partial surfaces of first surface 11a and second surface 11b may be uneven, and the surfaces of the remaining portions may be flat. Furthermore, second member 112 does not necessarily have to extend to the position of forming part 13 as shown in FIGS. 1 to 5. For example, second member 112 may have the substantially same height in the height direction as first surface 11a, and may not extend to the position of forming part 13. In this way, second member 112 may be modified to have various shapes as long as the surface opposite to the surface on which first surface 11a is in contact with cooked rice BH that has been evenly spread in the sheet like shape and fed into the apparatus can receive the ultraviolet rays.

(Ultraviolet Ray LED 12)

Ultraviolet Ray (UV) LED 12 is a 5 mm×5 mm rectangular chip-type LED that emits ultraviolet light using power supplied from power supply part 15, and is provided near second member 112 as shown in FIGS. 1 to 5. Lighting and extinguishing of the LED are controlled by control part 14. When UV LEDs 12 are turned on, the surface of second member 112 emits light (or glows) by guiding the ultraviolet rays emitted from the UV LED 12 thereinside. The surface of first member 111 emits light (or glows) by guiding ultraviolet rays emitted from the surface of third surface 11c of second member 112 thereinside. Ultraviolet rays attack the nuclei of organisms such as DNA and RNA so that the rays kill *Escherichia coli*, Typhoid, *Shigella*, O-157, *Salmonella, Campylobacter, Staphylococcus aureus, Bacillus subtilis*, and *Mycobacterium tuberculosis*, etc. In particular, there is a test result that 99.999% or more of *E. coli* and *Staphylococcus* were sterilized by being irradiated for 60 seconds with ultraviolet rays, using a 15 W germicidal lamp after 1000 hours of use. In addition to bacteria, ultraviolet rays are effective in removing/sanitizing/sterilizing coronaviruses, noroviruses, other viruses, mites, and the like.

In addition, the embodiment of UV LED 12 is not limited to the above-mentioned one. For example, UV LED 12 is not limited to a rectangular chip-type LED, and may be a tape-type LED in which a plurality of light emitting parts are arranged side by side at regular intervals. Furthermore, the "light source part" in the Claims may be any type of light source emitting ultraviolet light, and is not limited to LED.

Also, the location where UV LED 12 is installed is not limited to the above. UV LED 12 may be near second member 112 and may be in a different location than in FIG. 5 or may be near first member 111. In the cooked rice forming apparatus 1, when at least a portion of the cooked rice container 11 is irradiated with UV rays, the cooked rice container 11 transmits the UV rays, causing at least first surface 11a and second surface 11b to glow or emit light. UV LED 12 (light source part can be arranged at a desired location as long as it is in the vicinity of at least a portion of cooked rice storage section 11 (light guide part).

(Forming Part 13)

As shown in FIGS. 1 to 5, forming part 13 is arranged below the lower side of the slope of first surface 11a. Forming part 13 is composed with first roller(s) 131, second roller(s) 132 and third roller(s) 133. Each of which is a pair of rollers. The pair of first rollers 131 is arranged such that the interval therebetween is narrower than the opening of cooked rice contain part 11. The pair of second rollers 132 is arranged such that the interval therebetween is narrower than the interval of the pair of first rollers 131. The pair of third rollers 133 has a groove part 133a and is arranged such that the interval therebetween is narrower than the interval of the pair of second rollers 132. Also, first roller 131, the second roller 132 and the third roller 133 rotate using power supplied from power supply part 15. The rotation speed and torque of the rollers are controlled by control part 14.

With the above configuration, cooked rice BH moved from cooked rice contain part 11 is formed into the shape of sushi rice ball. Specifically, cooked rice BH moved from cooked rice contain part 11 is transferred as adjusting an amount of cooked rice BH suitable for one rice ball by first roller 131, second roller 132 and third roller 133 that are arranged so that their intervals gradually narrow. The shape is the sushi rice ball is adjusted and well shaped at groove part 133a of third roller 133, the sushi rice ball is discharged from discharging part 162.

In addition, the embodiment of forming part 13 is not limited to the above-mentioned one. For example, the number, interval, size, etc. of the rollers may be appropriately modified. Furthermore, forming part 13 is not limited to the embodiment using rollers. For example, the form of forming part 13 may be appropriately modified according to the shape to be formed, such as a substantially cylindrical shape like sushi rolls or a substantially triangular shape like "Onigiri" shape. In addition, by adjusting the rotation speed and torque of the roller, it is possible to adjust the hardness of the sushi rice ball and the production speed. Accordingly, it may be practical to provide an operation part in housing body 16 to adjust the rotation speed and torque. k Moreover, forming part 13 can be made into an embodiment of which the surface emits light/UV, glows by ultraviolet rays (or UV rays come out of the surface). With the embodiment, it is possible to sterilize cooked rice BH using the UV even while it is formed into the shape of sushi rice ball. The above embodiment is achieved, for example, by creating forming part 13 using a material having transparency like cooked rice contain part 11 so that ultraviolet rays emitted from a light source such as an UV LED provided inside or outside forming part 13 is guided.

(Control Part 14)

Control part 14 controls to turn on and off UV LED 12 and controls the rotation speed and torque of first roller 131, second roller 132 and third roller 133. Specifically, when control part 14 receives an operation start signal from operation switch (not shown) provided on housing body 16, control part 14 turns ultraviolet on LED 12, and rotates first roller 131, second roller 132 and third roller 133 at a preset rotation speed and torque. Upon receiving an operation end signal from the operation switch, control part 14 turns off UV LED 12 and stops the rotation of first roller 131, second roller 132 and third roller 133.

Further, while UV LED 12, first roller 131, second roller 132 and third roller 133 are in the above described operation corresponding to the operation start signal from the operation switch 164, control part 14 stops the operations of UV LED 12, first roller 131, second roller 132 and third roller 133 when lid part 163 provided on housing body 16 is opened, and the controller 14 resumes the operations of UV LED 12, first roller 131, second roller 132 and third roller 133 when lid part 163 is closed. This prevents the user from being exposed to ultraviolet light and prevents the user from being caught in the rollers.

In addition, the embodiment of forming part 13 is not limited to the above-mentioned one. For example, the start and end of the operations of UV LED 12, first roller 131, second roller 132 and third roller 133 are not limited due to the operations of operation switch 164. An operation switch for UV LED 12 and another operation switch for first roller 131, second roller 132 and third roller 133 may be provided and operated individually.

(Housing Body 16)

Housing body 16 accommodates cooked rice contain part 11, UV LED 12, forming part 13, control part 14 and power supply part 15. As shown in FIGS. 1 to 5, housing body 16 is provided with input part 161, discharging part 162, lid part 163, operation switch 164 and handle 165. Further, housing body 16 is made of a material that does not transmit ultraviolet rays (for example, opaque resin). This prevents the user from being exposed to ultraviolet rays.

In addition, the embodiment of forming part 13 is not limited to the above one. For example, forming part 13 may include a member for moving discharged cooked rice BH so that cooked rice BH, which was discharged/released from discharging part 162, does not interfere with another cooked rice BH that is next to be discharged. Specifically, a turntable may be provided at a discharge destination of the cooked rice BH. Control part 14 may control the turntable to rotate at a predetermined angle when cooked rice BH is discharged. Alternatively, a belt conveyor may be provided at the discharge destination of cooked rice BH. Control part 14 may control the belt conveyor to advance by a predetermined distance when cooked rice BH is discharged. Furthermore, housing body 16 may be configured such that the inner surface thereof is treated to reflect ultraviolet rays so that the ultraviolet rays emitted from cooked rice contain part 11 and UV LEDs 12 are reflected inside housing body 16. Thereby, cooked rice BH is irradiated with ultraviolet rays from more directions. Furthermore, by forming all or part of the surface reflecting ultraviolet rays in an arch shape, it is possible to irradiate cooked rice BH with ultraviolet rays from more directions.

(Using Method of Cooked Rice Forming Apparatus 1)

Figure 7:
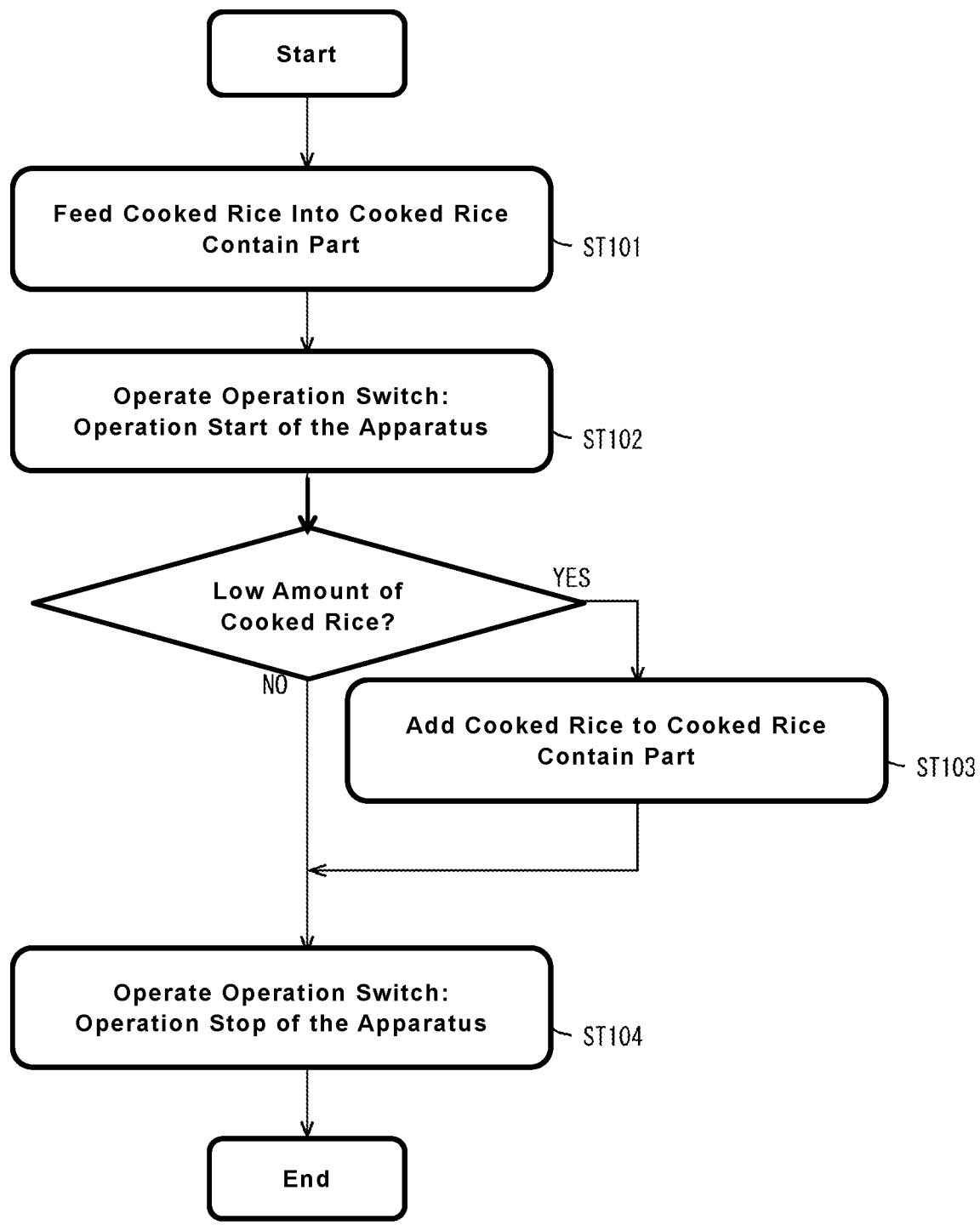
FIG. 7 is a flow chart explaining how to use cooked rice forming apparatus 1 according to the first embodiment to which the present invention is applied.

A using method of the cooked rice forming apparatus 1 is described based on the flowchart of FIG. 7.

First, at step 101 (ST101), lid part 163 of housing body 16 is opened, and cooked rice BH, which is evenly spread into a sheet like shape, is fed into cooked rice contain part 11 from input part 161, and lid part 163 is closed.

Next, at ST102, operation switch 164 is operated to start operations of UV LED 12, first roller 131, second roller 132 and third roller 133. As a result, cooked rice BH, which is fed into cooked rice contain part 11, slides on the first surface 11a due to its own weight to move to forming part 13 while being sterilized by ultraviolet rays emitted from UV LED 12, and the cooked rice is formed into the sushi rice ball by first roller 131, second roller 132 and third roller 133 and discharged from discharging part 162.

Further, when the amount of cooked rice BH fed into cooked rice contain part 11 is reduced (becoming low amount), the process proceeds to step 103 (ST103), lid part 163 of housing body 16 is opened, and cooked rice BH, evenly spread into a sheet like shape, is added (or additionally fed/input) from input part 161 to cooked rice contain part 11, and lid part 163 is closed. When cooked rice BH is added to cooked rice contain part 11 in this way, UV LED 12, first roller 131, second roller 132 and third roller 133 automatically stop their operating in correspondence with the opening of the lid part so that the safety of the user using the apparatus is secured (The user is not exposed by the ultraviolet rays as adding the cooked rice).

When the use of cooked rice forming apparatus 1 is stopped, the process proceeds to step 104 (ST104). Operation switch 164 is operated, and the operations of UV LED 12, first roller 131, second roller 132 and third roller 133 are stopped.

In this manner, cooked rice forming apparatus 1 forms cooked rice BH into the sushi rice ball shape only by inputting the cooked rice and operating operation switch 164.

As described above, cooked rice forming apparatus 1 according to the embodiment(s) of the present invention has a function of sterilizing cooked rice BH using an ultraviolet light source, and is compact and lightweight, compared to conventional apparatus. The invented apparatus can be suitably used even in small space restaurants and homes. In particular, cooked rice contain part 11 has a simple structure that does not use power, and is a member that simultaneously has a "function of sterilizing entire cooked rice BH" and a "function of feeding the cooked rice to the forming part." It contributes to miniaturization and weight reduction of cooked rice forming apparatus 1.

LEGENDS

1 Cooked rice forming apparatus
11 Cooked rice contain part; 11a First surface; 11b Second surface; 11c Third surface; 11d Fourth surface
111 First member
112 Second member
12 Ultraviolet ray LED (UV LED)
13 Forming part
131 First roller
132 Second roller
133 Third roller; 133a Groove
14 Control part
15 Power supply part
16 Housing part
161 Input part; 162 Discharging part; 163 Lid part; 164 Operation switch; 165 Handle
BH Cooked rice

What is claimed is:

1. A cooked rice forming apparatus for forming cooked rice into a desired shape wherein the cooked rice is evenly spread and formed into a sheet shape having a thickness smaller than a width, having two opposing sides in a thickness direction that are a front side and a back side and the cooked rice is fed into the cooked rice forming apparatus, the apparatus comprising:
 a light guide part that is provided with a first surface and a second surface, and made of a material having transparency, wherein
  the first surface is inclined with respect to an installation surface of the cooked rice forming apparatus so that the first surface has a slope, and that, when the cooked rice in the sheet shape is placed on the first surface with the back side of the cooked rice facing down, the cooked rice slides down on the slope of the first surface due to its own weight,
  the second surface is arranged on a lower side of the slope of the first surface and arranged to face toward the first surface with a predetermined space so that the front side of the cooked rice is not in contact with the second surface;
 a light source part that is a light source to emit ultraviolet rays and is provided near the light guide part;

a forming part that is arranged below a lower side of the slope of the first surface of the light guide part, and forms the cooked rice into the desired shape; and a housing body that accommodates an input part, a discharging part, the light guide part, the light source part and the forming part wherein the input part is arranged above an upper side of the slope of the first surface of the light guide part, and is an opening portion through which the cooked rice is fed, and the discharging part is arranged below the forming part and is an opening portion through which the cooked rice that has been formed in the desired shape by the forming part is discharged, wherein the light guide part is configured such that at least the first surface and the second surface glow due to the ultraviolet rays emitted from the light source part.

2. The cooked rice forming apparatus according to claim 1, wherein the light guide part is composed with two or more members, and one of the members is provided near the other members adjacent.

3. The cooked rice forming apparatus according to claim 1, wherein at least a portion of the first surface and a portion of the second surface of the light guide part are translucent.

4. The cooked rice forming apparatus according to claim 1, wherein the cooked rice is vinegared rice, the forming part forms the vinegared rice into a sushi rice ball shape.

5. The cooked rice forming apparatus according to claim 1, wherein the forming part is made of a material having transparency.

6. The cooked rice forming apparatus according to claim 1, wherein the light source part is placed only either at back of the first surface or at back of the second surface.

7. The cooked rice forming apparatus according to claim 1, wherein the slope of the first surface inclines at about 30 degrees with respect to the installation surface of the cooked rice forming apparatus.

8. The cooked rice forming apparatus according to claim 1, wherein the light source part is placed at back of the second surface so that the ultraviolet rays passing through the second surface illuminate the front side of the cooked rice and the ultraviolet rays transmitted to and emitted from the first surface illuminate the back side of the cooked rice.

9. A cooked rice forming apparatus for forming cooked rice into a desired shape wherein the cooked rice is evenly spread and formed into a sheet shape having a thickness smaller than a width, having two opposing sides in a thickness direction that are a front side and a back side and the cooked rice is fed into the cooked rice forming apparatus, the apparatus comprising:

a light guide part that is provided with a first surface and a second surface, and made of a material having transparency, wherein the first surface is inclined with respect to an installation surface of the cooked rice forming apparatus so that the first surface has a slope, and that, when the cooked rice in the sheet shape is placed on the first surface with the back side of the cooked rice facing down, the cooked rice slides down on the slope of the first surface due to its own weight, the second surface is arranged on a lower side of the slope of the first surface and arranged to face toward the first surface with a predetermined space so that the front side of the cooked rice is not in contact with the second surface;

a light source part that is a light source to emit ultraviolet rays and is provided near the light guide part;

a forming part that is arranged below a lower side of the slope of the first surface of the light guide part, and forms the cooked rice into the desired shape; and a housing body that accommodates an input part, a discharging part, the light guide part, the light source part and the forming part wherein the input part is arranged above an upper side of the slope of the first surface of the light guide part, and is an opening portion through which the cooked rice is fed, and the discharging part is arranged below the forming part and is an opening portion through which the cooked rice that has been formed in the desired shape by the forming part is discharged, wherein the light guide part is configured such that at least the first surface and the second surface glow due to the ultraviolet rays emitted from the light source part, the housing is made of a material that does not transmit ultraviolet rays, the housing has a lid part to open and close the input part, the cooked rice forming apparatus comprises a light source control part that controls to turn on and off the light source of the light source part, and the light source control part controls to turn off the light source when the lid is opened under a condition where the light source is on.

10. The cooked rice forming apparatus according to claim 9, wherein the light source part is placed at back of the second surface so that the ultraviolet rays passing through the second surface illuminate the front side of the cooked rice and the ultraviolet rays transmitted to and emitted from the first surface illuminate the back side of the cooked rice.

11. A cooked rice forming apparatus for forming cooked rice into a desired shape wherein the cooked rice is evenly spread and formed into a sheet shape having a thickness smaller than a width, having two opposing sides in a thickness direction that are a front side and a back side and the cooked rice is fed into the cooked rice forming apparatus, the apparatus comprising:

a light guide part that is provided with a first surface and a second surface, and made of a material having transparency, wherein the first surface is inclined with respect to an installation surface of the cooked rice forming apparatus so that the first surface has a slope, and that, when the cooked rice in the sheet shape is placed on the first surface with the back side of the cooked rice facing down, the cooked rice slides down on the slope of the first surface due to its own weight, the second surface is arranged on a lower side of the slope of the first surface and arranged to face toward the first surface with a predetermined space from the first surface so that the front side of the cooked rice is not in contact with the second surface;

a light source part that is a light source to emit ultraviolet rays and is provided near the light guide part;

a forming part that is arranged below a lower side of the slope of the first surface of the light guide part, and forms the cooked rice into the desired shape; and a housing body that accommodates an input part, a discharging part, the light guide part, the light source part and the forming part wherein the input part is arranged above an upper side of the slope of the first surface of the light guide part, and is an opening portion through which the cooked rice is fed, and the discharging part is arranged below the forming part and is an opening portion through which the cooked rice that has been formed in the desired shape by the forming part is discharged, wherein the light guide part is configured such that at least the first surface and the second surface glow due to the ultraviolet rays emitted from the light source part, the light guide part is configured with at least two different members that are a first member and a second member wherein the first member has the first surface and the second member has the second surface, when assembled in the housing body, the first member and the second member are in physical contact at a contact section, and the ultraviolet rays, which is emitted from the light source part and runs in one of the first and second members, is transmitted to the other of the first and second members through the contact section such that the first and second surfaces both glow.

12. The cooked rice forming apparatus according to claim 11, wherein an area of the contact section is ranged from 3% to 30% with respect to an area of the first surface.

13. The cooked rice forming apparatus according to claim 11, wherein an area of the contact section is ranged from 3% to 40% with respect to an area of the second surface.

14. The cooked rice forming apparatus according to claim 11, wherein the light source part is placed at back of the second surface so that the ultraviolet rays passing through the second surface illuminate the front side of the cooked rice and the ultraviolet rays transmitted to and emitted from the first surface illuminate the back side of the cooked rice.

* * * * *